United States Patent
Zhu et al.

(10) Patent No.: US 10,438,074 B2
(45) Date of Patent: Oct. 8, 2019

(54) METHOD AND SYSTEM FOR CONTROLLING DOOR LOCKS OF AUTONOMOUS DRIVING VEHICLES BASED ON LANE INFORMATION

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 98 days.

(21) Appl. No.: 15/622,377

(22) Filed: Jun. 14, 2017

(65) Prior Publication Data

US 2018/0363337 A1    Dec. 20, 2018

(51) Int. Cl.
*G06K 9/00* (2006.01)
*G05D 1/00* (2006.01)
*E05B 81/78* (2014.01)

(52) U.S. Cl.
CPC ....... *G06K 9/00798* (2013.01); *G05D 1/0088* (2013.01); *E05B 81/78* (2013.01)

(58) Field of Classification Search
CPC ......... G05D 1/0088; G05D 2201/0213; G05D 1/021; G05D 1/0223; G05D 1/0257; G05D 1/0022; G05D 1/0055; G05D 1/0212; G05D 1/0214; G05D 1/0219; G05D 1/0246; G05D 1/0274; G05D 1/0061; G05D 1/024; G05D 1/0242; G05D 1/0276; G06K 9/00805; G06K 9/00798; G06K 9/00201; G06K 9/00791; G06K 9/3241; G08G 1/166; G08G 1/167; G08G 1/16; G08G 1/005; G08G 1/056; G08G 1/165; G08G 1/202; B60W 10/20; B60W 30/09; B60W 2550/12; B60W 2550/14; B60W 2420/42; B60W 2420/52; B60W 2530/14; B60W 2550/10; B60W 2550/22; B60W 30/08; B60W 30/143; B60W 50/14; B60W 10/18; B60W 10/184; B60W 2550/402; B60W 2720/106; B60W 30/12; B60W 40/09; G06N 99/005; B60R 1/00; B60R 2300/30; H04L 67/12;
(Continued)

(56) References Cited

U.S. PATENT DOCUMENTS

| 9,682,707 B1* | 6/2017 | Silver .................. B60W 30/16 |
| 2008/0161987 A1* | 7/2008 | Breed .................... G08G 1/161 701/27 |

(Continued)

*Primary Examiner* — Abby Y Lin
*Assistant Examiner* — Sanjeev Malhotra
(74) *Attorney, Agent, or Firm* — Womble Bond Dickinson (US) LLP

(57) ABSTRACT

According to one embodiment, when perception data is received that perceives a driving environment of an ADV, the lane configuration of one or more lanes of a road is determined based on the perception data. A speed of the ADV and a lane location of the ADV within a lane in which the ADV is driving are determined based on the lane configuration. A driving scenario is derived based on the lane configuration, the speed of the ADV, and the lane location of the ADV. The door locks of one or more doors of the ADV are locked or unlocked based on the driving scenario. Whether to lock or unlock a door of the ADV may be determined according to a set of door lock control rules in view of the driving scenario at the particular point in time.

21 Claims, 6 Drawing Sheets

(58) Field of Classification Search
CPC ........ B62D 15/025; B62D 6/00; B62D 6/002;
G06Q 40/08; B60K 31/00; B60Q 1/44;
B60Q 1/50; G01C 21/32; G01C 21/3617;
G01S 17/06; G01S 7/4808; G06T
2207/10004; G06T 2207/10028; G06T
2207/30236; G06T 2207/30252; G06T
2207/30261; G06T 7/0044; G06T 7/0057;
G06T 7/20; G06T 7/223; G06T 7/231
USPC .......................... 701/23, 27; 705/4; 348/148
See application file for complete search history.

(56) References Cited

U.S. PATENT DOCUMENTS

| | | | | |
|---|---|---|---|---|
| 2010/0131308 A1* | 5/2010 | Collopy | ............ | G06Q 30/0224 705/4 |
| 2012/0083960 A1* | 4/2012 | Zhu | ............ | G01S 17/936 701/23 |
| 2014/0136045 A1* | 5/2014 | Zhu | ............ | G01S 17/936 701/23 |
| 2016/0288788 A1* | 10/2016 | Nagasaka | ............ | B62D 15/025 |
| 2016/0358477 A1* | 12/2016 | Ansari | ............ | G08G 1/167 |
| 2017/0261974 A1* | 9/2017 | Ebe | ............ | G05D 1/0005 |
| 2018/0011485 A1* | 1/2018 | Ferren | ............ | G05D 1/0022 |
| 2018/0025234 A1* | 1/2018 | Myers | ............ | B60R 1/00 348/148 |
| 2018/0032078 A1* | 2/2018 | Ferguson | ............ | G05D 1/0214 |
| 2018/0059672 A1* | 3/2018 | Li | ............ | G05D 1/0088 |
| 2018/0072327 A1* | 3/2018 | Seppelt | ............ | B60W 50/14 |
| 2018/0075747 A1* | 3/2018 | Pahwa | ............ | B60W 40/09 |
| 2018/0088582 A1* | 3/2018 | Kong | ............ | G05D 1/0214 |
| 2018/0095470 A1* | 4/2018 | Ansari | ............ | G05D 1/0212 |
| 2018/0107942 A1* | 4/2018 | Jiang | ............ | G05D 1/0291 |
| 2018/0111612 A1* | 4/2018 | Jiang | ............ | B60W 30/0956 |
| 2018/0127000 A1* | 5/2018 | Jiang | ............ | B60W 40/09 |
| 2018/0136643 A1* | 5/2018 | Tao | ............ | G05D 1/0022 |
| 2018/0136652 A1* | 5/2018 | Jiang | ............ | G05D 1/0088 |
| 2018/0136653 A1* | 5/2018 | Tao | ............ | G05D 1/0055 |
| 2018/0136654 A1* | 5/2018 | Kentley-Klay | ............ | G05D 1/0088 |
| 2018/0136655 A1* | 5/2018 | Kim | ............ | B60N 2/002 |
| 2018/0143622 A1* | 5/2018 | Zhu | ............ | G05D 1/0005 |
| 2018/0143632 A1* | 5/2018 | Zhu | ............ | B60W 10/08 |
| 2018/0143647 A1* | 5/2018 | Wang | ............ | G06N 20/00 |
| 2018/0164810 A1* | 6/2018 | Luo | ............ | B60W 10/06 |
| 2018/0170392 A1* | 6/2018 | Yang | ............ | B60W 40/09 |
| 2018/0170395 A1* | 6/2018 | Luo | ............ | B60W 40/13 |
| 2018/0178791 A1* | 6/2018 | Zhu | ............ | B60W 30/143 |
| 2018/0181135 A1* | 6/2018 | Urano | ............ | G05D 1/0055 |
| 2018/0186403 A1* | 7/2018 | Zhu | ............ | B62D 15/0265 |
| 2018/0188734 A1* | 7/2018 | Zhu | ............ | B60W 30/095 |
| 2018/0196421 A1* | 7/2018 | Carlhoff | ............ | G06K 9/00832 |
| 2018/0196440 A1* | 7/2018 | Zhu | ............ | B60W 30/143 |
| 2018/0201182 A1* | 7/2018 | Zhu | ............ | B60Q 1/46 |
| 2018/0201226 A1* | 7/2018 | Falkson | ............ | B60R 25/257 |
| 2018/0203450 A1* | 7/2018 | Zhu | ............ | B60K 31/00 |
| 2018/0211123 A1* | 7/2018 | Yasuda | ............ | G06K 9/00838 |
| 2018/0216942 A1* | 8/2018 | Wang | ............ | G01C 21/32 |
| 2018/0225968 A1* | 8/2018 | Wang | ............ | G08G 1/13 |
| 2018/0231640 A1* | 8/2018 | Han | ............ | G01S 7/4811 |
| 2018/0236972 A1* | 8/2018 | Linden | ............ | E05F 15/73 |
| 2018/0251135 A1* | 9/2018 | Luo | ............ | B60W 50/08 |
| 2018/0253647 A1* | 9/2018 | Yu | ............ | G06N 3/082 |
| 2018/0259967 A1* | 9/2018 | Frazzoli | ............ | G08G 1/166 |
| 2018/0259968 A1* | 9/2018 | Frazzoli | ............ | G08G 1/166 |
| 2018/0259969 A1* | 9/2018 | Frazzoli | ............ | G08G 1/16 |
| 2018/0260908 A1* | 9/2018 | Collopy | ............ | G06Q 40/08 |
| 2018/0272975 A1* | 9/2018 | Zhu | ............ | G08G 1/16 |

\* cited by examiner

400

| Driving Scenario 401 | Door Lock State 402 |
|---|---|
| Highway or express way | Locked |
| Not on a slowest lane | Locked |
| Slowest lane with a slow speed | Locked |
| Within parking area or loading zone with slow speed | Locked |
| Slow speed and close to the lane curb | Locked |
| ... | ... |

FIG. 4

METHOD AND SYSTEM FOR CONTROLLING DOOR LOCKS OF AUTONOMOUS DRIVING VEHICLES BASED ON LANE INFORMATION

TECHNICAL FIELD

Embodiments of the present disclosure relate generally to operating autonomous vehicles. More particularly, embodiments of the disclosure relate to automatically controlling door locks of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicle door automatic locking is an important safety feature. Conventional automatic door lock systems control the door locks of vehicles solely based on the speed of the vehicles. For example, a conventional vehicle would automatically lock the doors when the speed of the vehicle reaches a certain speed. Such door lock systems sometimes incorrectly lock or unlock doors at in appropriate situations.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an example of door control rules according to one embodiment.

DETAILED DESCRIPTION

Figure 1:
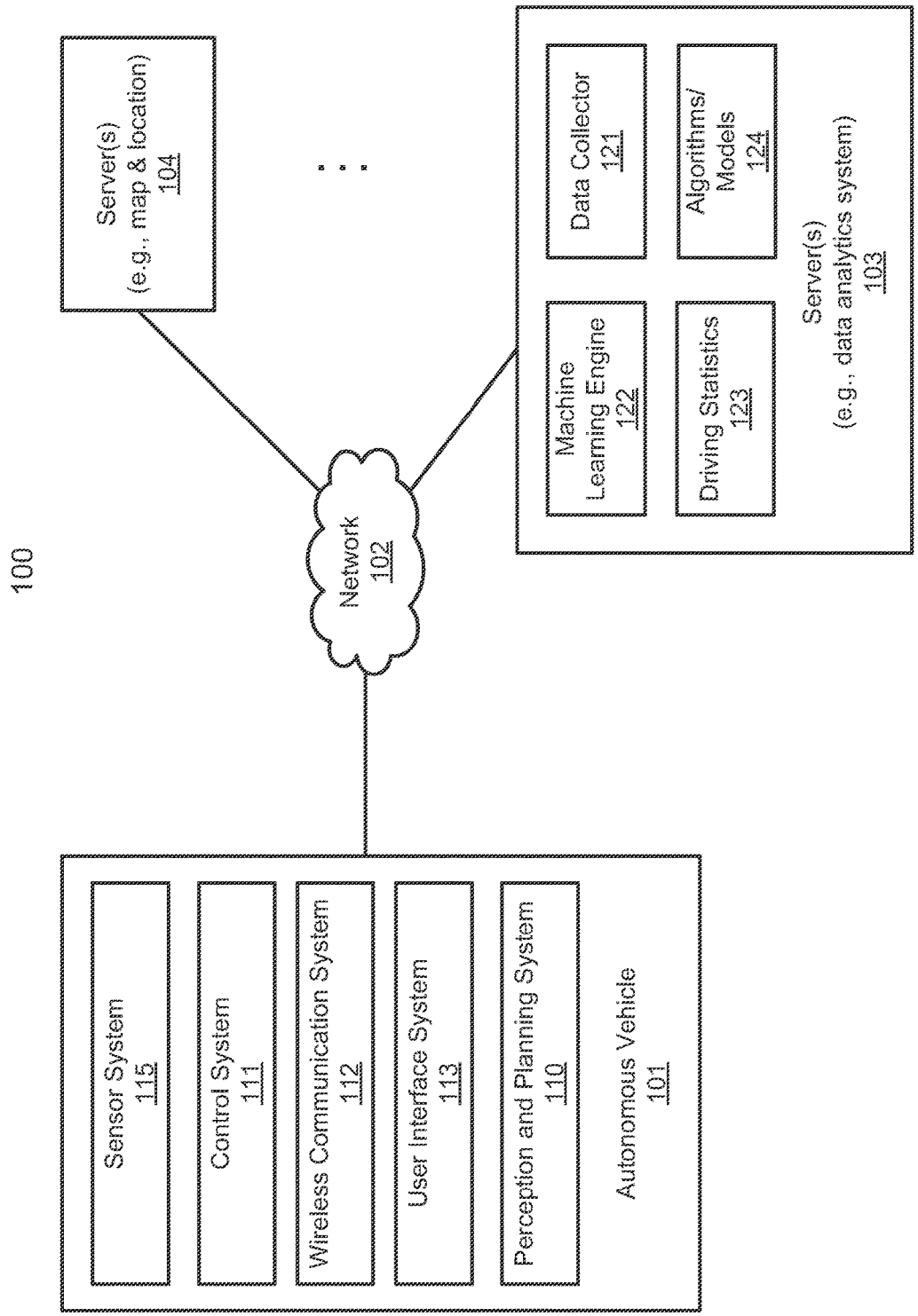
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, in addition to the speed of an autonomous driving vehicle (ADV), a door lock controller of the ADV automatically lock or unlock doors of the ADV based on perception data perceiving the driving environment surrounding the ADV such as lane configuration. The door lock controller may determine whether to lock or unlock a door of the ADV according to a set of door lock control rules in view of the driving environment perceived at the particular point in time. In one embodiment, when perception data is received that perceives a driving environment of an ADV, the lane configuration of one or more lanes of a road is determined based on the perception data. A speed of the ADV and a lane location of the ADV within a lane are determined based on the lane configuration. A driving scenario is derived based on the lane configuration, the speed of the ADV, and the lane location of the ADV. The door locks of one or more doors of the ADV are locked or unlocked based on the driving scenario.

For example, if the ADV is travelling in a lane other than the slowest lane based on the lane location of the lane in which the ADV is moving, one or more door locks of the ADV may be locked. The slowest lane refers to a lane closest to the curb or sidewalk of the road such as the most right lane or most left lane dependent upon the jurisdiction. If it is determined that the ADV is travelling on a highway or an express way based on map information of the road in which the ADV is moving, the door locks of the ADV may be locked. On the other hands, if it is determined the ADV is travelling on the slowest lane and the speed of the ADV is below a predetermined threshold, the door locks of the ADV may be unlocked; otherwise, the door locks may be locked. If the ADV is travelling in the slowest lane and the distance between the ADV and a curb or sidewalk of the lane is shorter than a predetermined threshold, the door locks of the ADV may be unlocked; otherwise, the door locks may be locked. If the ADV is moving with a speed below a predetermined threshold and the ADV is within a parking area or a loading zone of a road, the door locks of the ADV may be unlocked; otherwise, the door locks may be locked.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
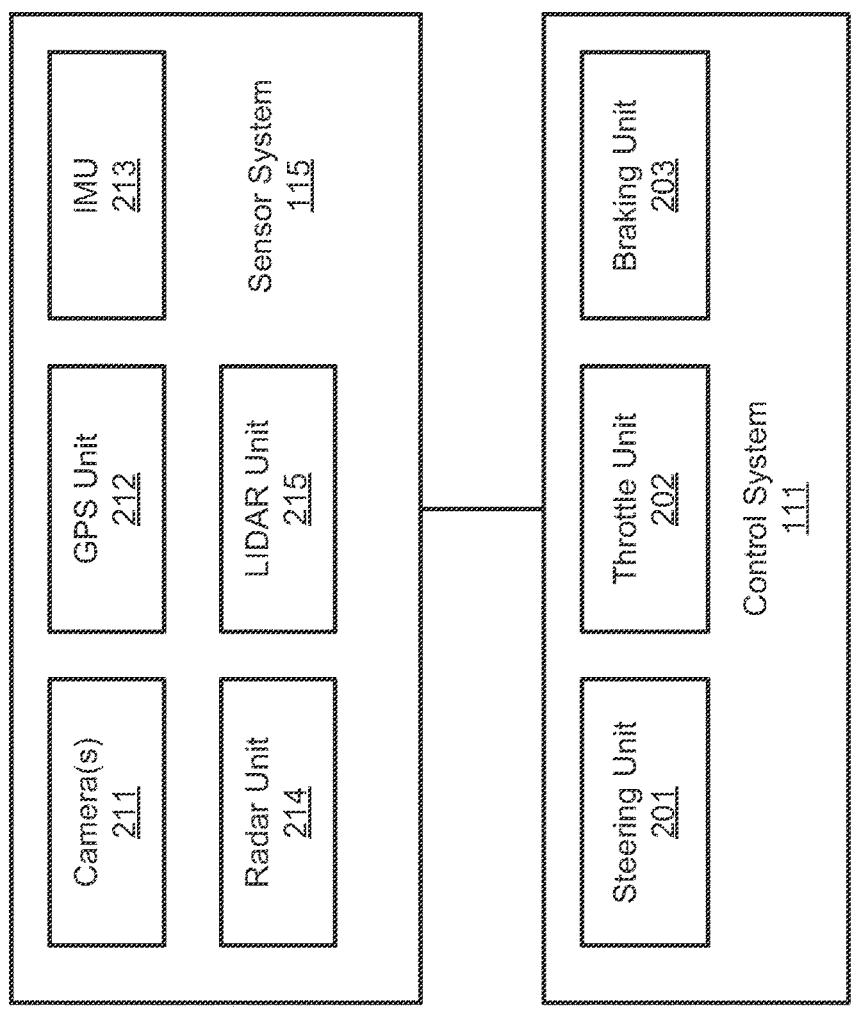
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, rules 124 may include a set of door lock control rules. The door lock control rules specify certain driving scenarios under which the door locks of an autonomous driving vehicle should be locked or unlocked. The door lock control rules may be compiled based on a large amount of driving statistics 123, as well as user interactions during the autonomous driving of the ADVs. Machine learning engine 122 is configured to learn passengers' tendency regarding operations of the door locks based on driving statistics 123, in view of the related traffic safety rules or regulations. An example of door lock control rules is shown in FIG. 4, which will be described in details further below. The door lock control rules are then uploaded onto ADVs to be utilized in real-time for controlling door locks of the ADVs.

Figure 3:
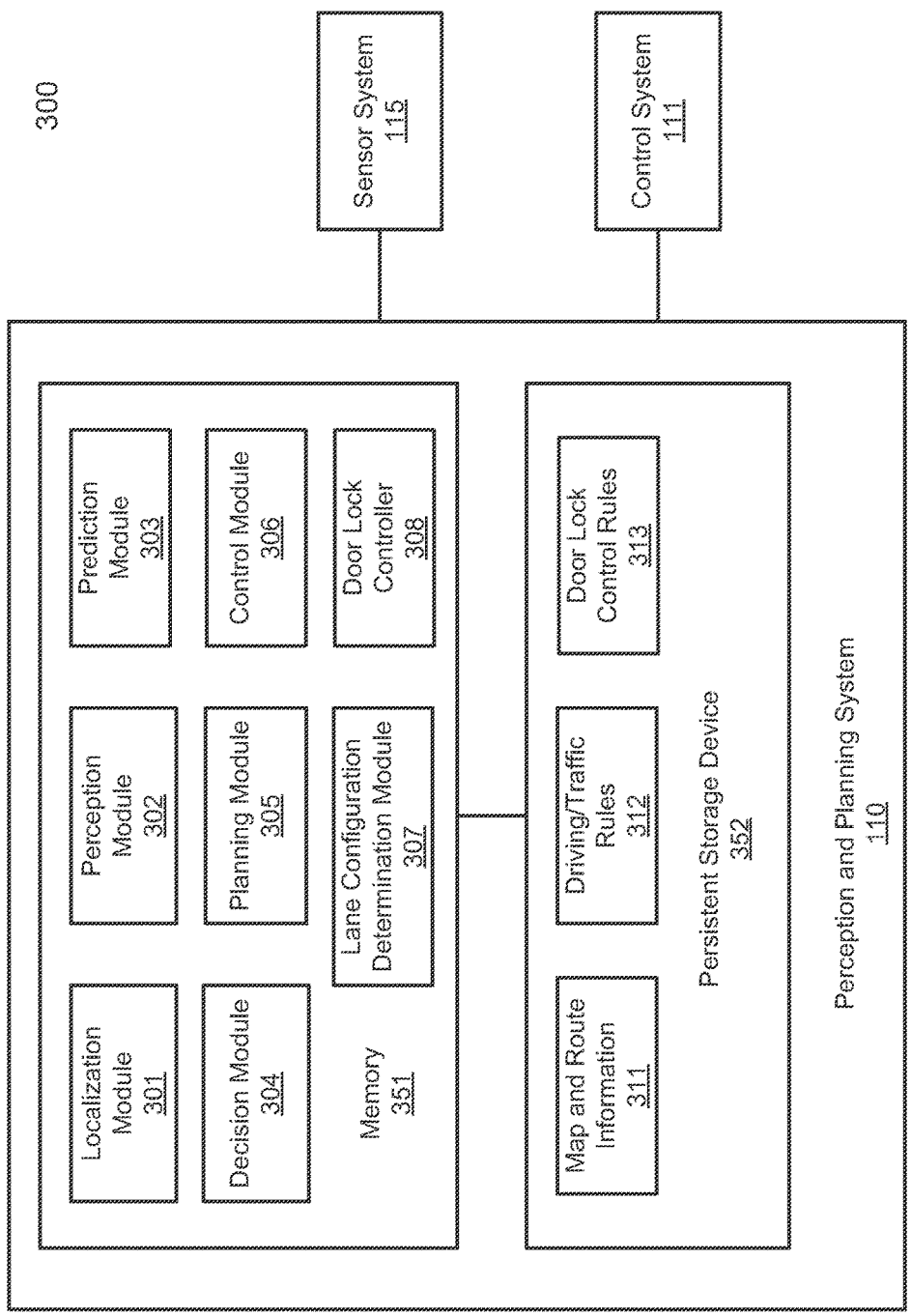
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, lane configuration determination module 307, and door controller 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, lane configuration determination module 307 (also referred to as a driving scenario determination module) is configured to receive perception data from perception module 302, prediction data from prediction module 303, and/or decision data from decision module 304, as well as map and route data from map and route information source 311. Lane configuration determination module 307 may further receive other data such as planning and control data from planning module 305 and/or control module 306. Based on the data, lane configuration determination module 307 determines the lane configuration of a lane in which the ADV is travelling. Based on the lane configuration as well as the speed and a lane location of the ADV of a lane in which the ADV is moving, a driving scenario is determined by lane configuration determination module 307. Based on the driving scenario, door lock controller 308 is configured to control door locks of doors of the ADV.

In one embodiment, based on the driving scenario, door lock controller 308 looks up in a set of door lock control rules to determine a state of the door locks or a control action to be taken on the door locks. An example of the door lock control rules are shown in FIG. 4. Referring now to FIG. 4, in this example, door lock control rules are maintained in driving scenario to lock state (scenario/lock state) mapping table 400. Mapping table 400 includes a number of mapping entries. Each mapping entry maps a particular driving scenario 401 to a state of door locks or action to be taken 402. Based on a particular driving scenario determined by lane configuration determination module 307, door lock controller 308 looks up in table 400 to search and locate a mapping entry that matches the driving scenario. Door lock controller 308 then obtains a door lock state from the matching entry and locks or unlocks the door locks of the ADV based on the door lock state.

In one embodiment, if the ADV is travelling in a lane other than the slowest lane based on the lane location of the lane in which the ADV is moving, one or more door locks of the ADV may be locked. A slowest lane refers to a lane that is closest to a curb or sidewalk of a road, such as a most right lane or most left lane dependent upon the jurisdiction. The lane location of the ADV can be determined based on the perception data provided by perception module 302. For example, the lane location can be determined based on an image of the road captured by a camera, including performing an image recognition of the image to determine which lane the ADV is travelling.

According to another embodiment, if it is determined that the ADV is travelling on a highway or an express way, the door locks of the ADV may be locked. Such a determination can be performed based on the map and route information. For example, for a high definition map, the map can provide additional metadata indicating whether a particular road is a highway or an express way. For a regular map, an image recognition on a map image may be performed to recognize whether a road is a highway or an express way, for example, based on the shape and/or color of the road from the map, as well as the speed of the ADV and real-time images of the driving environment captured at the point in time.

According to another embodiment, if it is determined the ADV is travelling on the slowest lane and the speed of the ADV is below a predetermined threshold, the door locks of the ADV may be unlocked; otherwise, the door locks may be locked. Dependent upon the jurisdiction, the slowest lane may be the most right lane (e.g., U.S. system) or the most left lane (e.g., Hong Kong system). The speed of the vehicle can be measured by a variety of sensors. If the ADV is travelling in the slowest lane and the distance between the ADV and a curb or sidewalk of the lane is shorter than a predetermined threshold, the door locks of the ADV may be unlocked; otherwise, the door locks may be locked. The distance between the vehicle and the curb can be measured by a variety of sensors such as camera or radar. If the ADV is moving with a speed below a predetermined threshold and the ADV is within a parking area or a loading zone of a road, the door locks of the ADV may be unlocked; otherwise, the door locks may be locked. The parking area or a loading zone can be determined based on the map and route data and/or perception data based on real-time images of the driving environment. Note that lane configuration determination module 307 and door lock controller 308 may be integrated together as an integrated module. Also note that although the door lock control rules are described as a mapping table, the door lock control rules can also be implemented in other forms such as a database.

Figure 5:
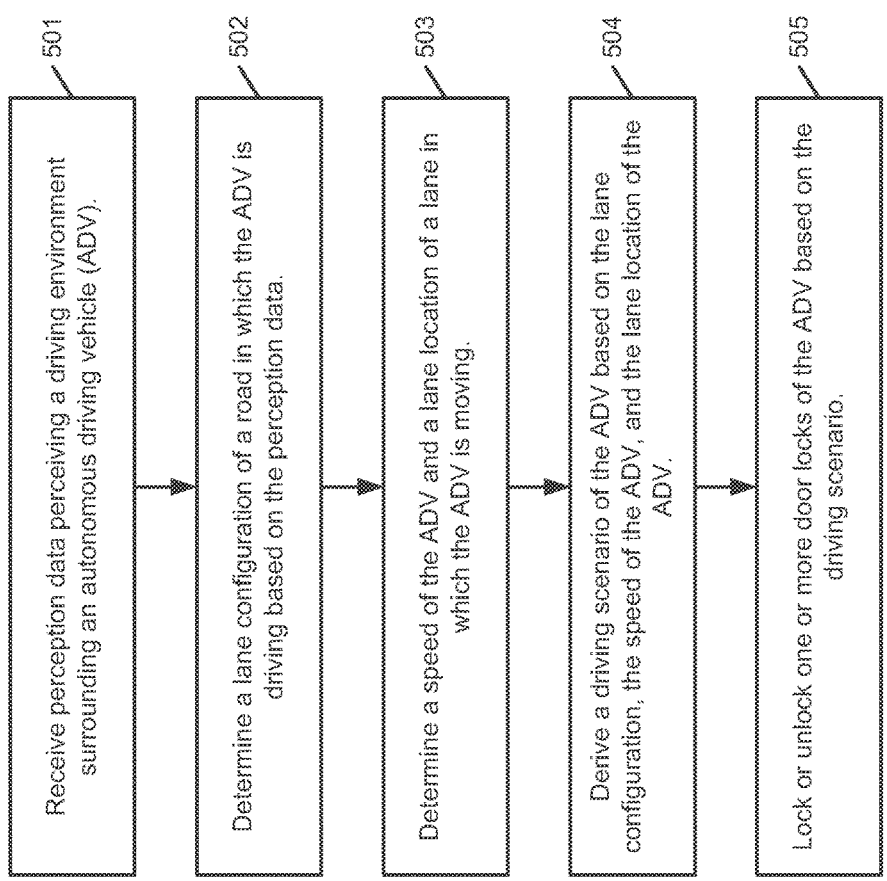
FIG. 5 is a flow diagram illustrating a process of automatically controlling door locks of an autonomous driving vehicle according to one embodiment.

FIG. 5 is a flow diagram illustrating a process of controlling door locks of an autonomous driving vehicle according to one embodiment. Process 500 may be performed by processing logic which may include software, hardware, or a combination thereof. For example, process 500 may be performed by lane configuration determination module 307 and/or door lock controller 308. Referring to FIG. 5, in operation 501, processing logic receives perception data perceiving a driving environment surrounding an ADV. The perception data may include information provided by perception module 302, prediction module 303, decision module 304, planning module 305, and/or control module 306. In operation 502, processing logic determines a lane configuration of a road in which the ADV is traveling based on the perception data. In operation 503, processing logic determines a speed of the ADV and a lane location of the ADV. In operation 504, processing logic derives a driving scenario of the ADV based on the lane configuration, the speed of the ADV, and the location of the ADV. In operation 505, processing logic locks or unlocks door locks of the ADV based on the driving scenario. In one embodiment, processing logic looks in a set of door lock control rules based on the driving scenario to determine a lock state corresponding to the driving scenario and controls the door locks of the ADV based on the determined lock state.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
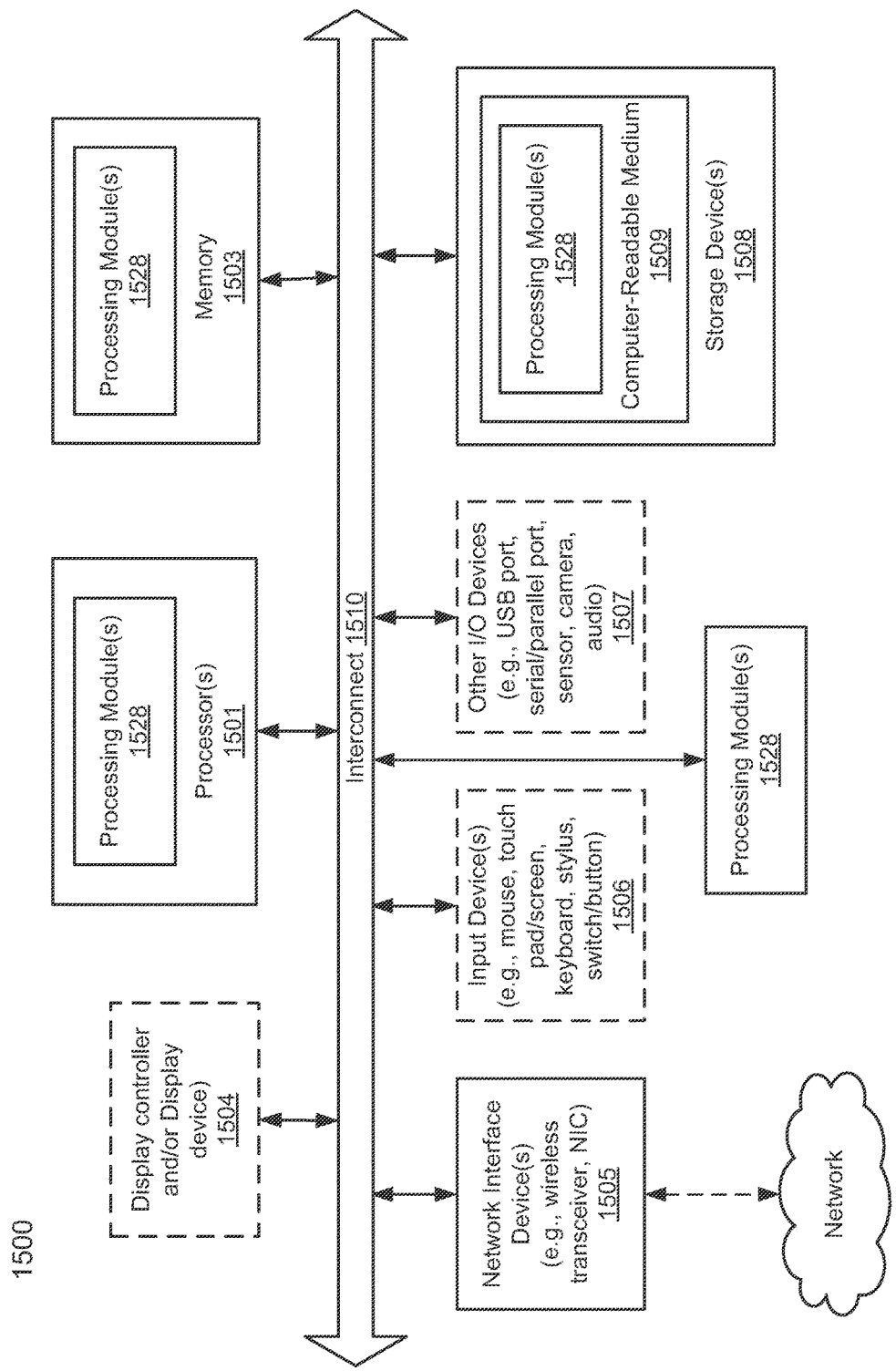
FIG. 6 is a block diagram illustrating a data processing system according to one embodiment.

FIG. 6 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, lane configuration determination module 307, and/or door lock controller 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    receiving perception data that perceives a driving environment surrounding an autonomous driving vehicle (ADV);
    determining, based on the perception data, a lane configuration of one or more lanes of a road in which the ADV is moving;
    determining a speed of the ADV and a lane location of the ADV within a lane in which the ADV is moving;
    deriving a driving scenario based on the lane configuration, the speed of the ADV, and the lane location of the ADV; and
    locking or unlocking one or more door locks of the ADV based on the driving scenario, while the ADV is moving within the lane.

2. The method of claim 1, wherein locking or unlocking one or more door locks of the ADV comprises:
    determining whether the ADV is traveling in a lane other than a slowest lane of the road based on the perception data; and
    locking the one or more door locks, in response to determining that the ADV is traveling in a lane other than the slowest lane of road.

3. The method of claim 1, wherein locking or unlocking one or more door locks of the ADV comprises:
    determining whether the ADV is traveling on a high way or an express lane based on the perception data; and
    locking the one or more door locks, in response to determining that the ADV is traveling on the high way or the express lane.

4. The method of claim 1, wherein locking or unlocking one or more door locks of the ADV comprises:
    determining whether the ADV is traveling in a slowest lane of the road based on the perception data;
    determining whether the speed of the ADV is below a predetermined threshold; and
    unlocking the one or more door locks, in response to determining that the ADV is traveling in the slowest lane of the road and the speed of the ADV is below the predetermined threshold.

5. The method of claim 1, wherein locking or unlocking one or more door locks of the ADV comprises:
    determining whether the ADV is moving with a speed below a predetermined threshold and the ADV is within a parking area or loading zone of the road based on the perception data; and
    unlocking the one or more door locks, in response to determining that the ADV is moving with the speed below the predetermined threshold and is within the parking area or the loading zone of the road.

6. The method of claim 1, wherein locking or unlocking one or more door locks of the ADV comprises:
    determining whether the ADV is traveling in a slowest lane of the road based on the perception data;
    determining a distance between the ADV and a curb of the slowest lane based on the perception data; and
    unlocking the one or more door locks, in response to determining that the ADV is traveling in the slowest lane of the road and the distance between the ADV and the curb of the slowest lane is below a first predetermined threshold.

7. The method of claim 6, further comprising determining whether the speed of the ADV is below a second predetermined threshold, wherein the door locks are unlocked only if the speed of the ADV is below the second predetermined threshold.

8. A non-transitory machine-readable medium having instructions stored therein, which when executed by a processor, cause the processor to perform operations of operating an autonomous driving vehicle, the operations comprising:
    receiving perception data that perceives a driving environment surrounding an autonomous driving vehicle (ADV);
    determining, based on the perception data, a lane configuration of one or more lanes of a road in which the ADV is moving;
    determining a speed of the ADV and a lane location of the ADV within a lane in which the ADV is moving;
    deriving a driving scenario based on the lane configuration, the speed of the ADV, and the lane location of the ADV; and locking or unlocking one or more door locks of the ADV based on the driving scenario, while the ADV is moving within the lane.

9. The machine-readable medium of claim 8, wherein locking or unlocking one or more door locks of the ADV comprises:
   determining whether the ADV is traveling in a lane other than a slowest lane of the road based on the perception data; and
   locking the one or more door locks, in response to determining that the ADV is traveling in a lane other than the slowest lane of road.

10. The machine-readable medium of claim 8, wherein locking or unlocking one or more door locks of the ADV comprises:
    determining whether the ADV is traveling on a high way or an express lane based on the perception data; and
    locking the one or more door locks, in response to determining that the ADV is traveling on the high way or the express lane.

11. The machine-readable medium of claim 8, wherein locking or unlocking one or more door locks of the ADV comprises:
    determining whether the ADV is traveling in a slowest lane of the road based on the perception data;
    determining whether the speed of the ADV is below a predetermined threshold; and
    unlocking the one or more door locks, in response to determining that the ADV is traveling in the slowest lane of the road and the speed of the ADV is below the predetermined threshold.

12. The machine-readable medium of claim 8, wherein locking or unlocking one or more door locks of the ADV comprises:
    determining whether the ADV is moving with a speed below a predetermined threshold and the ADV is within a parking area or loading zone of the road based on the perception data; and
    unlocking the one or more door locks, in response to determining that the ADV is moving with the speed below the predetermined threshold and is within the parking area or the loading zone of the road.

13. The machine-readable medium of claim 8, wherein locking or unlocking one or more door locks of the ADV comprises:
    determining whether the ADV is traveling in a slowest lane of the road based on the perception data;
    determining a distance between the ADV and a curb of the slowest lane based on the perception data; and
    unlocking the one or more door locks, in response to determining that the ADV is traveling in the slowest lane of the road and the distance between the ADV and the curb of the slowest lane is below a first predetermined threshold.

14. The machine-readable medium of claim 13, wherein the operations further comprise determining whether the speed of the ADV is below a second predetermined threshold, wherein the door locks are unlocked only if the speed of the ADV is below the second predetermined threshold.

15. A data processing system, comprising:
    a processor; and
    a memory coupled to the processor to store instructions, which when executed by the processor, cause the processor to perform operations, the operations including
    receiving perception data that perceives a driving environment surrounding an autonomous driving vehicle (ADV),
    determining, based on the perception data, a lane configuration of one or more lanes of a road in which the ADV is moving,
    determining a speed of the ADV and a lane location of the ADV within a lane in which the ADV is moving,
    deriving a driving scenario based on the lane configuration, the speed of the ADV, and the lane location of the ADV, and
    locking or unlocking one or more door locks of the ADV based on the driving scenario, while the ADV is moving within the lane.

16. The system of claim 15, wherein locking or unlocking one or more door locks of the ADV comprises:
    determining whether the ADV is traveling in a lane other than a slowest lane of the road based on the perception data; and
    locking the one or more door locks, in response to determining that the ADV is traveling in a lane other than the slowest lane of road.

17. The system of claim 15, wherein locking or unlocking one or more door locks of the ADV comprises:
    determining whether the ADV is traveling on a high way or an express lane based on the perception data; and
    locking the one or more door locks, in response to determining that the ADV is traveling on the high way or the express lane.

18. The system of claim 15, wherein locking or unlocking one or more door locks of the ADV comprises:
    determining whether the ADV is traveling in a slowest lane of the road based on the perception data;
    determining whether the speed of the ADV is below a predetermined threshold; and
    unlocking the one or more door locks, in response to determining that the ADV is traveling in the slowest lane of the road and the speed of the ADV is below the predetermined threshold.

19. The system of claim 15, wherein locking or unlocking one or more door locks of the ADV comprises:
    determining whether the ADV is moving with a speed below a predetermined threshold and the ADV is within a parking area or loading zone of the road based on the perception data; and
    unlocking the one or more door locks, in response to determining that the ADV is moving with the speed below the predetermined threshold and is within the parking area or the loading zone of the road.

20. The system of claim 15, wherein locking or unlocking one or more door locks of the ADV comprises:
    determining whether the ADV is traveling in a slowest lane of the road based on the perception data;
    determining a distance between the ADV and a curb of the slowest lane based on the perception data; and
    unlocking the one or more door locks, in response to determining that the ADV is traveling in the slowest lane of the road and the distance between the ADV and the curb of the slowest lane is below a first predetermined threshold.

21. The system of claim 20, wherein the operations further comprise determining whether the speed of the ADV is below a second predetermined threshold, wherein the door locks are unlocked only if the speed of the ADV is below the second predetermined threshold.

* * * * *